United States Patent [19]

Herrin

[11] 4,381,101

[45] Apr. 26, 1983

[54] DRAFT GEAR REMOVAL APPARATUS

[75] Inventor: Sam W. Herrin, Arlington, Tex.

[73] Assignee: Halliburton Company, Duncan, Okla.

[21] Appl. No.: 236,947

[22] Filed: Feb. 23, 1981

[51] Int. Cl.[3] .................................................. B60P 1/48

[52] U.S. Cl. .................................... 254/9 R; 254/122; 254/133 R

[58] Field of Search ............... 254/9 C, 122, 133, 134; 187/18; 29/426.5, 252; 182/141, 157, 158; 414/589, 485; 269/17; 105/420; 213/1 R, 50

[56] References Cited

U.S. PATENT DOCUMENTS

| | | | |
|---|---|---|---|
| 2,471,901 | 5/1949 | Ross . | |
| 2,533,980 | 12/1950 | Weaver . | |
| 3,110,476 | 11/1963 | Farris . | |
| 3,174,722 | 3/1965 | Alm . | |
| 3,203,670 | 8/1965 | Farris . | |
| 3,237,921 | 3/1966 | Jay . | |
| 3,509,796 | 5/1970 | Warren et al. . | |
| 3,744,116 | 7/1973 | Peterson | 29/252 |
| 3,758,462 | 1/1974 | Coad et al. . | |
| 3,797,097 | 3/1974 | Peterson | 29/252 |
| 3,823,915 | 7/1974 | Koehler . | |
| 3,982,718 | 9/1976 | Folkenroth et al. . | |
| 3,983,960 | 1/1975 | Sikli . | |

*Primary Examiner*—Robert C. Watson

*Attorney, Agent, or Firm*—James R. Duzan

[57] ABSTRACT

A draft gear removal apparatus comprising a hydraulically actuated scissors type draft gear lifting apparatus having a plurality of wheels mounted outboard on the base thereof having portions thereof extending above the base and two of the wheels being steerable and having a hydraulically actuated draft gear compression device removably mounted on the table of the lifting apparatus having a movable plurality of hydraulically actuated cylinders thereon to selectively bear against the center sill of a railcar to assist in the removal of a compressed draft gear from the center sill.

11 Claims, 6 Drawing Figures

DRAFT GEAR REMOVAL APPARATUS

BACKGROUND OF THE INVENTION

This invention relates to an improved draft gear removal apparatus for the removal of draft gear from railcars.

During normal operation of a railcar the draft gear connecting the railcar coupler to the center sill of the railcar is removed from the railcar for repair or replacement. One type of prior draft gear removal apparatus used to remove the draft gear of a railcar has utilized a scissors type portable or movable lifting apparatus having wheels mounted on the bottom thereof extending entirely therebelow and having a hydraulic compression type draft gear device mounted on the upper surface thereof with the hydraulic compression type draft gear device utilizing a hydraulic cylinder to compress the railcar draft gear and four fixed hydraulic cylinders to bear against the center sill of the railcar to remove the compressed draft gear therefrom.

While the prior draft gear removal apparatus has proved generally satisfactory, since the apparatus utilizes wheels mounted entirely below the base of the apparatus, it is necessary to use small diameter wheels in order to obtain sufficient vertical clearance to satisfactorily remove the compressed draft gear from the railcar center sill which thereby causes the apparatus to be difficult to move on rough and uneven surfaces since the heavily loaded apparatus has a high rolling resistance due to the small wheels. Also, since the hydraulic compression draft gear device utilizes four fixed hydraulic cylinders to bear against the center sill of the railcar the placement of the hydraulic cylinders cannot be varied to accomodate varying conditions of orientation of the draft gear with respect to the center sill so that the compressed draft gear may be removed in the most efficient manner.

Another prior art type draft gear removal apparatus utilizes a scissors type portable or movable lifting apparatus having a base which may be moved about by forklift vehicles, which may have flanged wheels thereon for installation on rails or which may have flanged wheels and pneumatic tired wheels thereon. Mounted on the upper surface of the scissors type lifting apparatus is a hydraulic compression type draft gear device having a fastening means thereon to secure the same to the upper surface of the lifting apparatus.

This type of draft gear removal apparatus tends to be large in size when equipped with both flanged wheels and pneumatic tired wheels since the pneumatic tired wheels are located outboard the flanged wheels and are of large diameter to prevent contact of the flanged wheels and the earth. Also, the draft gear removal device lacks any means to bear against the center sill of the railcar to remove draft gear units which might be jammed within the center sill.

Yet another type prior art draft gear removal apparatus utilizes a scissors type portable or movable lifting apparatus having three wheels mounted outboard the base with one wheel being steerable to guide the apparatus about and possibly having a swivel top on the upper surface of the lifting apparatus.

This prior art draft gear removal apparatus lacks any means to compress a draft gear for the removal thereof from the center sill of a railcar.

Still yet another prior art draft gear removal apparatus utilizes a scissors type lifting apparatus having four wheels secured outboard the base thereof extending entirely therebelow.

This prior art draft gear removal apparatus also lacks a draft gear removal apparatus to compress a draft gear for the removal thereof from the center sill of a railcar.

In U.S. Pat. No. 2,471,901 a load-lifting apparatus utilizing duplicate transversely-registered, fourlink pantograph lifting mechanisms is shown having four wheels secured within the base of the lifting mechanism with portions of the wheels extending above the base of the lifting mechanism and with two of the wheels being steerable for guiding the load-lifting apparatus during transport operations.

STATEMENT OF THE INVENTION

In contrast to the prior art draft gear removal apparatus the present invention comprises a hydraulically actuated scissors type draft gear lifting apparatus having a plurality of wheels mounted outboard on the base thereof having portions thereof extending above the base and two of the wheels being steerable and having a hydraulically actuated draft gear compression device removably mounted on the table of the lifting apparatus having a movable plurality of hydraulically actuated cylinders thereon to selectively bear against the center sill of a railcar to assist in the removal of a compressed draft gear from the center sill.

BRIEF DESCRIPTION OF THE DRAWINGS

The foregoing invention will be more fully understood when taken in conjunction with the following specification and drawings wherein.

DESCRIPTION OF THE INVENTION

Figure 1:
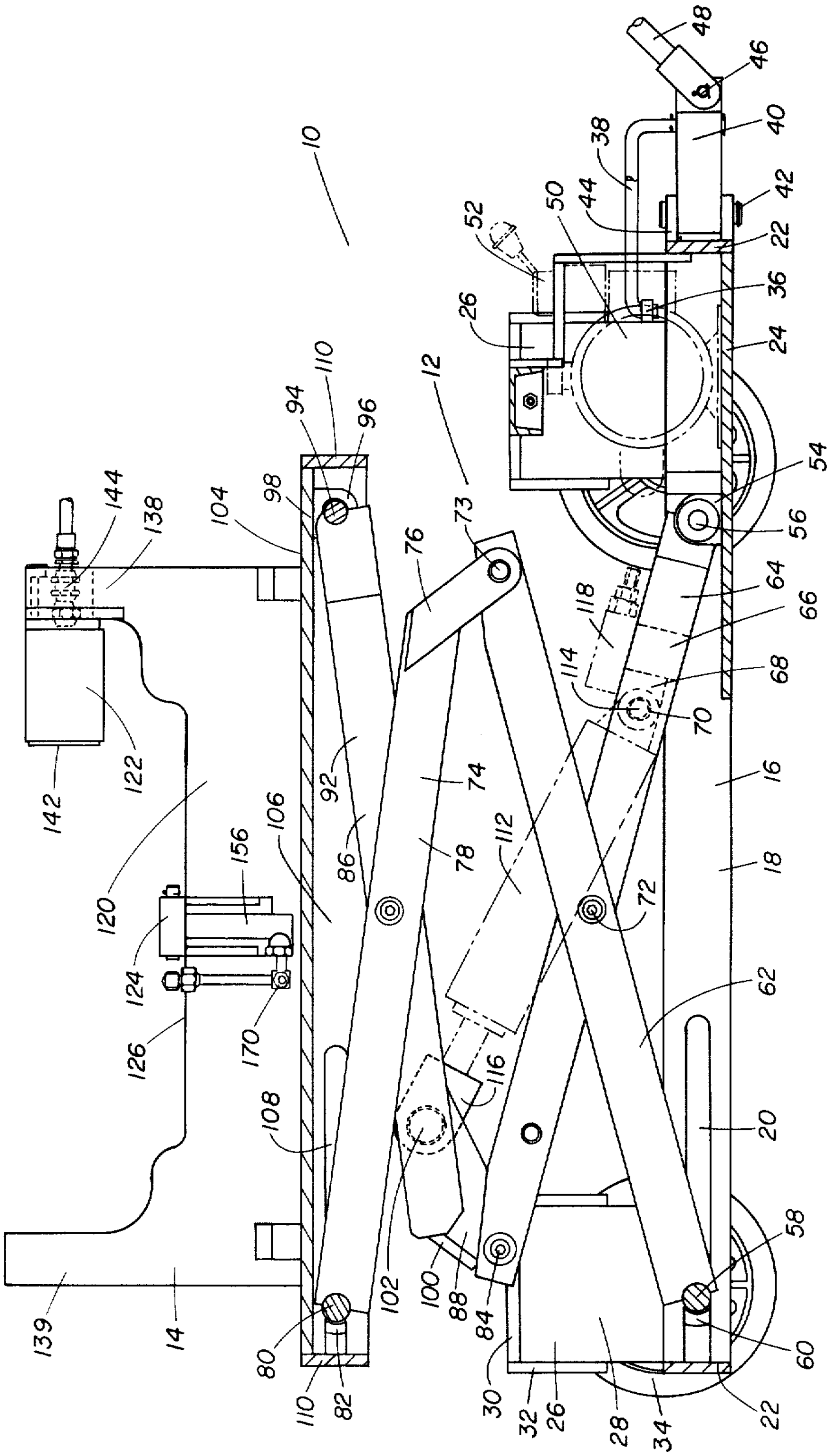
FIG. 1 is a partial cross-sectional view of the present invention.

Referring to FIG. 1, the present invention is shown in its preferred embodiment.

The draft gear removal apparatus 10 of the present invention comprises lifting apparatus 12 and draft gear compression device 14.

The lifting apparatus 12 comprises a generally rectangular frame 16 having rectangularly shaped hollow side members 18 having, in turn, in one end portion thereof elongate slots 20 therein, end members 22 secured to the side members 18 and end plate 24 secured to the other end portion of the side members 18 and one end member 22. Secured to each side member 18 are wheel mounting brackets 26 extending thereabove. Each wheel mounting bracket 26 comprises side portion 28, top portion 30, reinforcement portion 32 secured to the side portion 28 and top portion 30 and wheel means 34 secured to the top portion 30. Two of the wheel means 34 have clevis means 36 secured about the axle thereof connected to linkage means 38 which is connected to tongue 40 pivotally secured to end member 22 by pin means 42 and bracket means 44 and pivotally secured by pin means 46 to handle means 48. This arrangement allows two of the wheel means 34 to be steered by handle means 48 to allow the draft gear removal apparatus 10 to be placed in a desired location as the draft gear removal apparatus 10 is being moved about.

Secured to the rectangular frame 16 on one end portion thereof is motor means and pump means 50 and flow control means 52. The motor means may be any suitable type electric, pneumatic or hydraulic motor means while the pump means driven by the motor means may be any suitable type of hydraulic pump means. The fluid flow from the motor means and pump means 50 is controlled by flow control means 52 which may be of any suitable type.

Secured to the end plate 24 are brackets 54 having annular rod 56 extending therethrough and rotatable therein.

Extending through elongate slots 20 in the side members 18 is rod 58 having rotatable members 60 on each end thereof which rotatably engage the interior of side member 18.

Secured to rod 58 are lower arm members 62 while lower arm members 64 are secured to annular rod 56. Lower arm members 64 are secured together by transverse member 66 which contains a plurality of lugs 68 each having an aperture 70 therein.

The lower arm members 62 and 64 are pivotally secured to each other by means of transverse pivot rod 72 running through apertures in the members 62 and 64 at approximately the midpoint thereof.

Pivotally secured by means of rod means 73 to one end of lower arm members 62 are upper arm members 74. Each upper arm member 74 comprises a first portion 76 having aperture 78 in one end thereof and having the other end secured to one end of second portion 78. The other end of second portion 78 is secured to rod means 80 which, in turn, has wheel means 82 mounted on each end thereof.

Pivotally secured by means of rod means 84 to one end of lower arm members 64 are upper arm members 86. Each upper arm member 86 comprises a first portion 88 having aperture 90 (not shown) in one end thereof which pivotally receives rod means 84 therein and having the other end secured to one end of second portion 92. The other end of second portion 92 is secured to rod means 94 which, in turn, is secured by means of rod member lugs 96 to the top 98 of the table 104 of the lifting apparatus 12. The upper arm members 86 are secured together by means of connector plate 100 and cylinder pivot bar 102.

The table 104 of the lifting apparatus 12 comprises rectangular shaped hollow side members 106 having elongate slots 108 in one end thereof, horizontal top plates 110 and top 98. The top 98 is formed having a plurality of apertures therein (not shown).

The table 104 of the lifting apparatus 12 is raised and lowered by means of a plurality of hydraulically actuated cylinders 112 which have one end thereof secured to lugs 68 by pin means 114 while the other end thereof is secured to lug means 116 which are secured to cylinder pivot bar 102. The hydraulically actuated cylinders 112 are supplied hydraulic fluid under pressure from the motor and pump means 50. The flow of fluid is controlled by means of flow control means 52 and overcenter valve means 118 to prevent the hydraulically actuated cylinders 112 from extending themselves to a position where the lifting apparatus 12 would be extended to its maximum vertical height and then be lowered from that position while the hydraulically actuated cylinders 112 continue to extend themselves. The overcenter valve means 118 is used to prevent moving loads from overrunning the pump, lock the load in the event of a hydraulic system failure and provide static overpressure relief of hydraulic fluid.

It should be noted that the upper arm members 74 and 86 are formed such that the angular relationship of the first portions 76 and 88 of each upper arm members 74 and 86 with respect to the second portions 78 and 92 thereof is such that when the lifting apparatus is lowered the second portions 78 and 92 overlay lower arm members 62 and 64 with the second portions 78 and 92 being approximately parallel to the lower arm members 62 and 64 so that the lifting apparatus occupies a minimum vertical height when completely lowered.

Removably secured to the top 98 of the table 104 by means of lugs (not shown) mating with the apertures in the top 98 of the lifting apparatus 12 is draft gear compression device 14.

The draft gear compression device 14 comprises a generally U-shaped frame 120 having a removable hydraulically actuated draft gear compression cylinder 122 on one end thereof and having a movable hydraulically actuated center sill press means 124 in the center portion 126 thereof.

Figure 2:
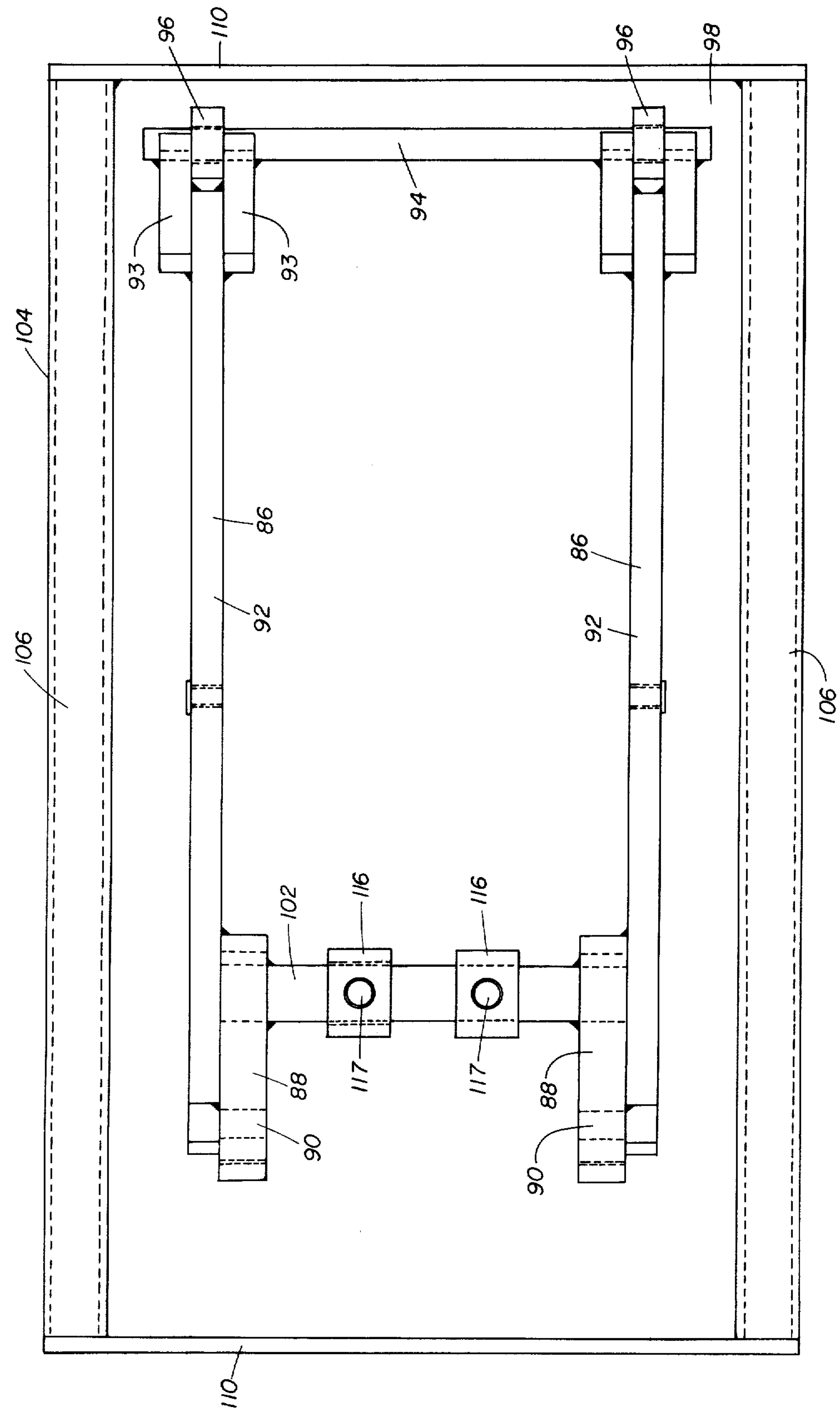
FIG. 2 is a top view of a portion of the lifting apparatus linkage of the present invention beneath the table of the lifting apparatus.

Referring to FIG. 2 the table 104 of the lifting apparatus 12 along with the upper arm members 86 is shown.

The table 104 comprises rectangular shaped hollow side members 106, horizontal top plates 110 and top 98.

Each upper arm member 86 comprises a first portion 88 having aperture 90 in one end thereof and having the other end secured to one end of second portion 92. The other end of second portion 92 is secured to rod means 94 at bifurcated end portion 93. The rod means 94 is secured to the top 98 of the table 104 by rod member lugs 96.

Lug means 116 are secured to cylinder pivot bar 102, each containing aperture 117 therein to mate with the end of a hydraulically actuated cylinder 112.

Figure 3:
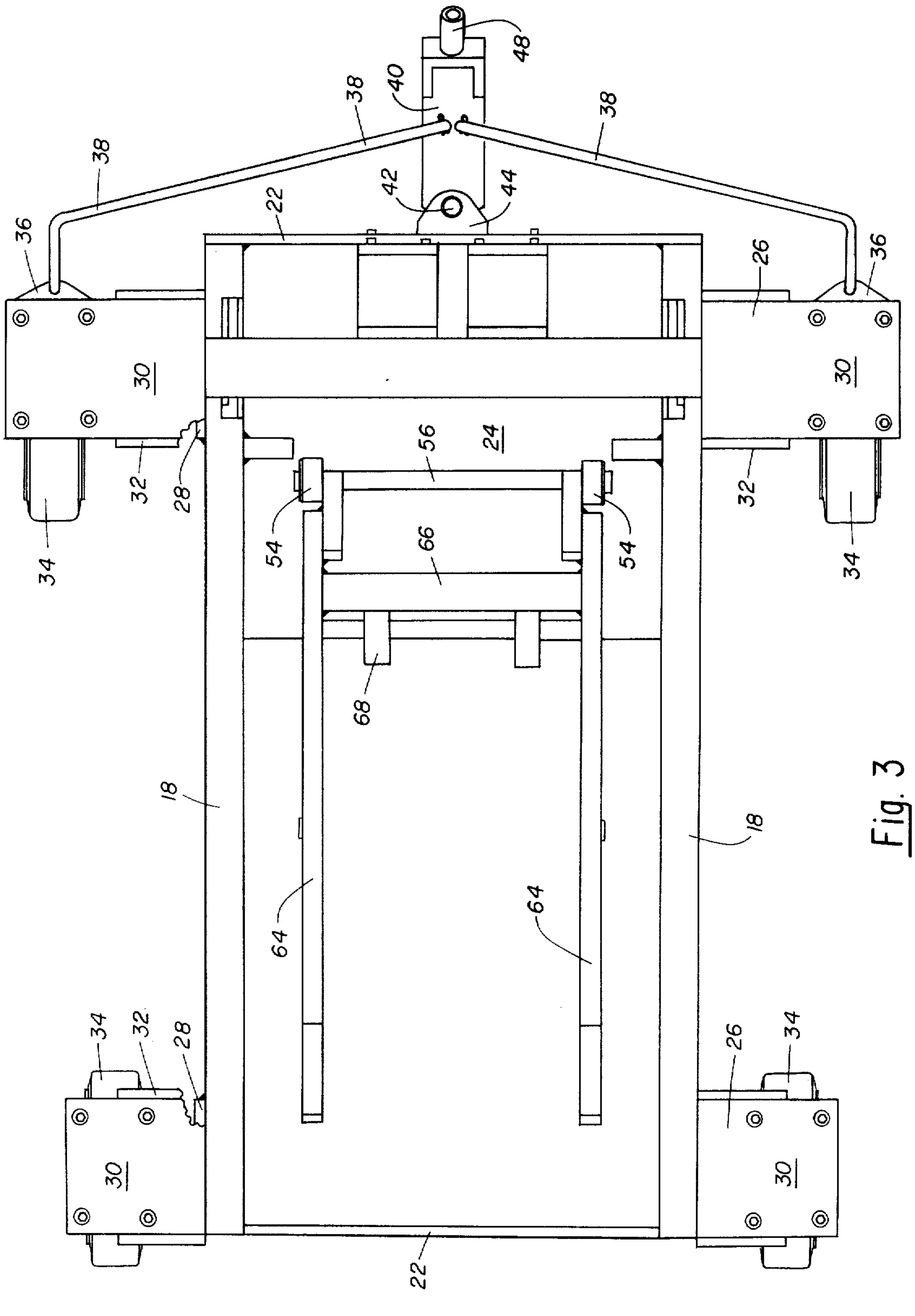
FIG. 3 is a top view of a portion of the lifting apparatus linkage and base of the present invention.

Referring to FIG. 3, the bottom of the lifting apparatus 12 is shown.

The rectangular frame 16 comprises generally rectangular shaped hollow side members 18, end members 22 and end plate 24.

Secured to each side member 18 are wheel mounting brackets 26.

Two of the wheel means 34 have clevis means 36 secured about the axle thereof connected to linkage means 38 which is connected to tongue 40.

Secured to end plate 24 are brackets 54 having annular rod 56 extending therethrough and rotatable therein. Lower arm members 64 are secured together by transverse member 66 which contains a plurality of lugs 68.

Figure 4:
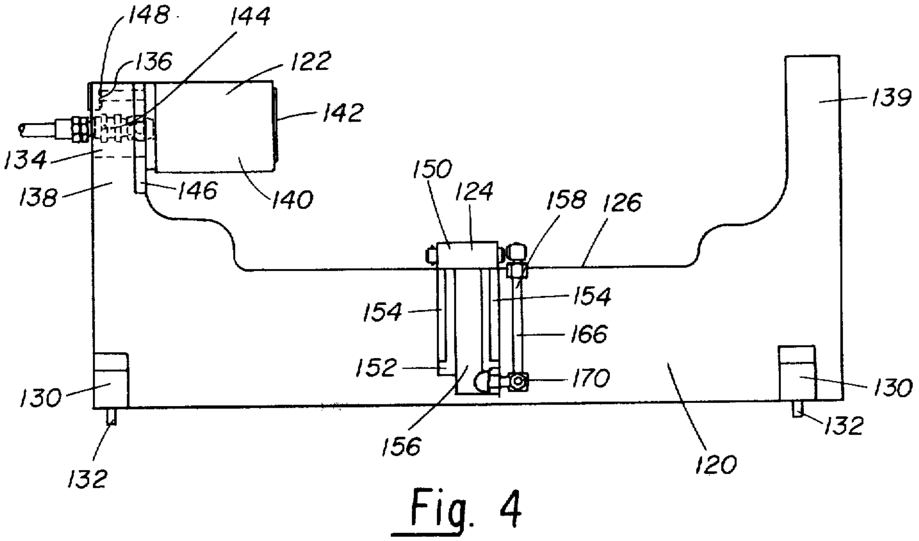
FIG. 4 is a side view of the draft gear compression device of the present invention.

Referring to FIG. 4 the draft gear compression device 14 is shown.

The draft gear compression device 14 comprises a generally U-shaped frame 120 having removable hydraulically actuated draft gear compression cylinder 122 on one end thereof and having a movable hydraulically actuated centersill press means 124 in the center portion 126 thereof.

The U-shaped frame 120 is formed having a plurality of feet 130 thereon, each foot 130 having, in turn, a pin means 132 thereon which mates with apertures in the top 98 of the table 104 to detachably secure the draft gear compression device 14 to the lifting apparatus 12.

The U-shaped frame 120 is further formed having a generally circular shaped slot 134 and recess 136 in arm portion 138.

The hydraulically actuated draft gear compression cylinder 122 comprises cylinder housing means 140 having piston means 142 movably retained therein, coupling means 144 secured to one end of the cylinder housing means 140 to allow the pump means 200 to be connected to cylinder 122 to actuate the same, and mounting plate 146 having L-shaped retainer bracket 148 secured to one end thereof.

The hydraulically actuated center sill press means 124 comprises hinge plates 150 having hinge means 151 (not shown) on one end thereof, side plates 152, reinforcing plates 154, hydraulical cylinders 156, one mounted on each hinge plate 150 and hydraulic line means 158 interconnecting the hydraulic cylinders 156.

Figure 5:
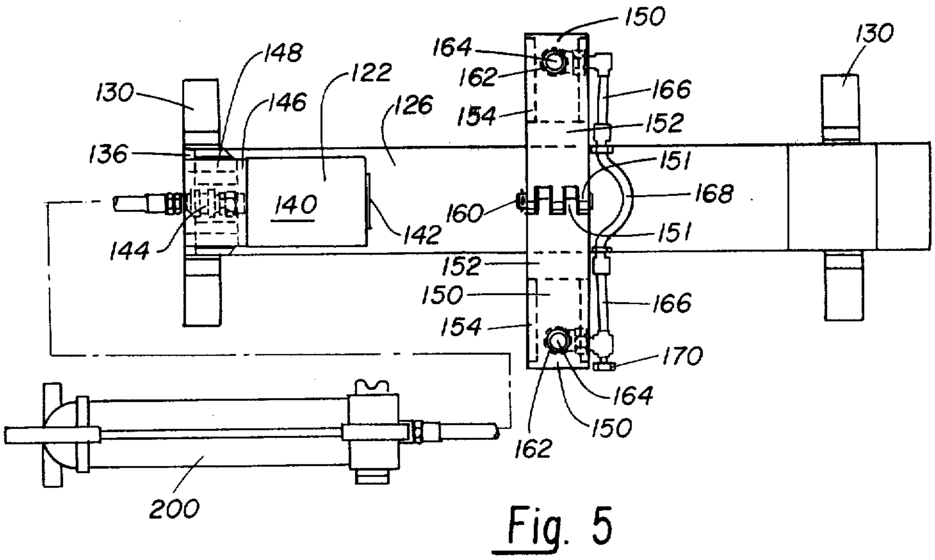
FIG. 5 is a top view of the draft gear compression device of the present invention.

Referring to FIG. 5, the hydraulically actuated center sill press means 124 is shown in top view.

The L-shaped retainer bracket 148 secured to one end of cylinder housing means 140 has a portion thereof, one end portion, which extends into recess 136 in arm portion 138 while coupler 144 secured to cylinder housing means 140 extends into circular slot 134 of arm portion 138. In this manner the draft gear compression cylinder 122 is detachably secured to arm portion 138 of the frame 120.

The hinge plates 150 of the center sill press means 124 are secured together by pin means 160 which passes through an aperture in the hinge means 151 of such hinge plate 150. Each hinge plate 150 is formed having an aperture 162 in one end thereof through which the piston means 164 of hydraulic cylinder 156 extends.

The hydraulic cylinders 156 are interconnected by hydraulic line means 158. The hydraulic line means 158 comprises L-shaped fixed portions 166 which extend from the bottom of each hydraulic cylinder 156 to the top of center portion 126 of frame means 120, flexible portion 168 which interconnect L-shaped fixed portions 166 and allows hinge plates 150 to flex relative to each other to allow movement of the center sill press means 124 about the center portion 126 of frame means 120, and connector means 170 to allow a pump means to be connected to hydraulic cylinders 156 to actuate the same.

Figure 6:
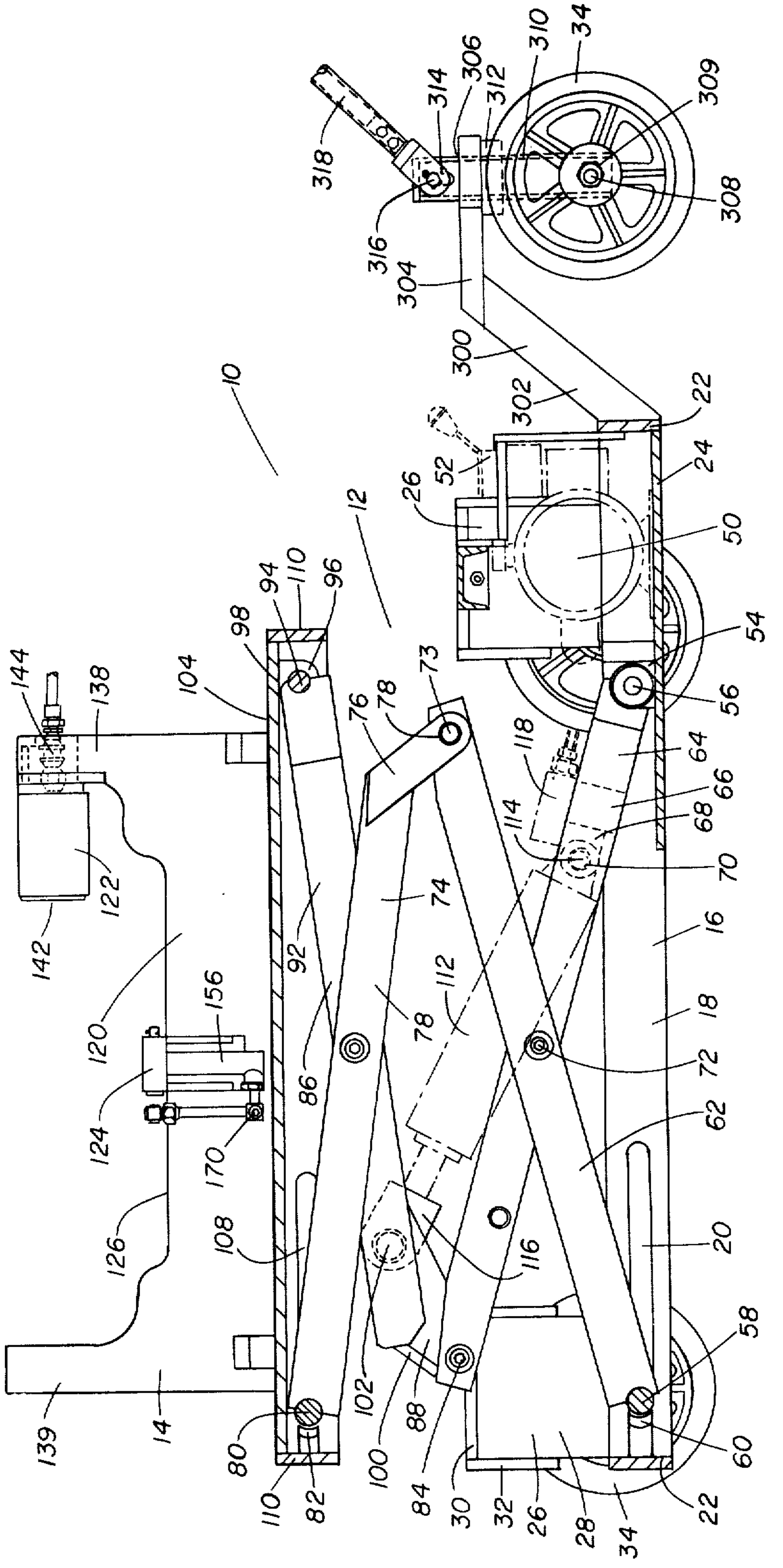
FIG. 6 is a partial cross-sectional view of the present invention showing an alternative mounting and steering arrangement for the wheels located on one end of the invention.

Referring to FIG. 6, the draft gear removal apparatus 10 is shown utilizing an alternative mounting and steering arrangement for the wheels located on one end of the lifting apparatus 12.

The lifting apparatus 12 comprises a generally rectangular frame 16 having rectangularly shaped hollow side members 18 having, in turn, in one end portion thereof elongate slot 20 therein, end members 22 secured to the side members 18 and end plate 24 secured to the other end portion of the side members 18 and one end member 22. Secured to each side member 18 on one end thereof are wheel mounting brackets 26 extending thereabove. Each wheel mounting bracket 26 comprises side portion 28, top portion 30, reinforcement portion 32 secured to the side portion 28 and top portion 30 and wheel means 34 secured to the top portion 30.

Secured to end member 22 on the other end of rectangular frame 16 by means of centrally located mounting bracket 300 are steerable wheel means 34. The mounting bracket 300 comprises a first portion 302 having one end secured to end member 22, the first portion 302 extending angularly upward from the end member 22, and having the other end secured to a second portion 304 which extends horizontally away from the rectangular frame 16. The second portion 304 is formed having an aperture 306 in one end thereof. The steerable wheel means 34 are secured to threaded fastening means 308 to pivot 310 having aperture 309 in one end thereof, having bearing plate 312 thereon which abuts the lower surface of second portion 304, having the other end passing through aperture 306 in second portion 304 and having elongate aperture 314 in the other end thereof secured to pivot 310 by pin means 316 in handle means 318.

OPERATION OF THE APPARATUS

Referring again to FIG. 1, to remove the draft gear from the end of the center sill of a railcar after the truck has been removed from the end of the railcar, the draft gear removal apparatus 10 is positioned below the draft gear.

A suitable power source is connected to the motor and pump means 50 to actuate the same thereby causing hydraulic fluid under pressure to flow to the hydraulic cylinders 112 thereby causing the table 104 of the lifting apparatus 12 to be raised.

When the table 104 of the lifting apparatus 12 has been raised to the proper position the U-shaped frame means 120 of the draft gear compression device 14 will have arms 138 having draft gear compression cylinder 122 thereon and 139 disposed about the draft gear in the center sill of the railcar.

A suitable hydraulic pump means, such as hand actuated hydraulic pump means 200, is connected to connector means 144 of the draft gear compression cylinder 122 and actuated to cause piston means 142 of the cylinder 122 to extend into engagement with the draft gear in the center sill of the railcar to compress the same so that the draft gear may be removed from the center sill.

If the draft gear is stuck in the center sill of the railcar after it has been compressed, a suitable hydraulic pump means, such as hand actuated hydraulic pump means 200, is connected to coupler 170 of the hydraulically actuated center sill press means 124. The center sill press means 124 is moved along center portion 126 of the U-shaped frame means 120 until it is in the proper position beneath the stuck draft gear so that hydraulic cylinders 156 may be actuated to cause the piston means thereof to bear against the center sill of the railcar thereby forcing the stuck compressed draft gear therefrom while the lifting apparatus 12 is being simultaneously lowered.

When the compressed draft gear has been removed from the center sill of the railcar, the pistons of the cylinders 156 of the hydraulically actuated center sill press means 124 are retracted, if extended, and the lifting apparatus 12 is lowered to its fully collapsed or lowered position with upper arms 74 and 86 overlaying lower arms 62 and 64 and the table 104 overlaying the upper and lower arms respectively. At this time the draft gear removal apparatus 10 having the compressed draft gear thereon may be removed from beneath the end of the railcar and the compressed draft gear transported to the desired location to be repaired after the removal from the draft gear compression device 14.

It should be apparent that the lifting apparatus 12 may be utilized without having the draft gear compression device 14 mounted thereon. If it is desired to utilize only the lifting apparatus 12, the draft gear compression device 14 is merely removed from the table 104 of the apparatus 12 thereby leaving an unobstructed work surface in the form of the top 98 of the table 104.

To reinstall the draft gear compression device 14 on the lifting apparatus 12 the device 14 is lowered on to the top 98 of the table 104 having the pin means 132 located on the feet 130 of the apparatus 12 engaging the apertures in the top 98 of the table 104.

From the foregoing it can be easily seen that the draft gear removal apparatus 10 of the present invention offers features not present in prior art draft gear removal apparatus.

Having thus described my invention, I claim:

1. A draft gear removal apparatus for the removal of draft gear from the center sill of a railcar, wherein the draft gear removal apparatus comprises:
- lifting apparatus means comprising:
  - rectangular frame means;
  - wheel means secured to the rectangular frame means about the periphery thereof and having a portion thereof extending above the rectangular frame means;
  - a plurality of first lower arm means, each having one end thereof movably secured to the rectangular frame means;
  - a plurality of second lower arm means, each having one end thereof movably secured to the rectangular frame means and movably secured to one of the plurality of first lower arm means;
  - a plurality of first upper arm means, each having one end thereof movably secured to the other end of one of the plurality of second lower arm means;
  - a plurality of second upper arm means, each having one end thereof movably secured to the other end of one of the plurality of the first lower arm means;
  - table means having frame means and top means having a plurality of apertures therein, each of the plurality of second upper arms means having the other end thereof movably secured to the frame means of the table means and each of the plurality of the first upper arm means having the other end thereof movably secured to the rectangular frame means of the table means;
  - hydraulic cylinder means having one end thereof secured to the plurality of first lower arm means and the other end thereof secured to the plurality of first upper arm means;
  - pump means mounted on the rectangular frame means for supplying fluid under pressure to the hydraulic cylinder means;
  - motor means mounted on the rectangular frame means for driving the pump means;
  - handle means movably secured to the rectangular frame means;
  - flow control means to control the flow of fluid to the hydraulic cylinder means from the pump means; and
  - over-center valve means disposed between the pump means and hydraulic cylinder means; and
- draft gear compression apparatus comprising:
  - U-shaped frame means having a center portion, first arm portion connected to one end of the center portion, second arm portion connected to the other end of the center portion having aperture means therein and a plurality of feet means secured to the center portion, each having a pin means projecting therefrom which mates with an aperture of the plurality of apertures in the top of the table means;
  - draft gear compression cylinder means detachably secured to the second arm portion of the U-shaped frame means; and
  - hinged center sill press means movable on the center portion of the U-shaped frame means and having hydraulic cylinder means mounted thereon.

2. The apparatus of claim 1 wherein the lifting apparatus means further comprises:
- bracket means secured to the rectangular frame means;
- tongue means movably secured to the bracket means;
- clevis means secured to each wheel means on the rectangular frame means adjacent the tongue means; and
- linkage means having one end thereof connected to the tongue means and the other end thereof connected to the linkage means connected to the wheel means
- whereby the handle means movably secured to the rectangular frame means is secured thereto by the bracket means and tongue means.

3. The apparatus of claim 1 wherein the draft gear compression cylinder means further comprises:
- cylinder means having piston means extensible from one end thereof;
- mounting plate means secured to the other end of the cylinder means;
- L-shaped bracket means secured to the mounting plate means; and
- connector means connected to the other end of the cylinder means and extending into a portion of the recess means in the second arm portion of the U-shaped frame means.

4. The apparatus of claim 1 wherein the hinged center sill press means further comprises:
- first hinge plate means having hinge means on one end thereof, aperture means on the other end thereof, side plate means, reinforcing plate means secured to the side plate means and the first hinge plate means and cylinder means secured to the other end of the first hinge plate means having the piston thereof extensible through the aperture means on the other end of the first hinge plate means;
- second hinge plate means having hinge means on one end thereof, aperture means on the other end thereof, side plate means, reinforcing plate means secured to the side plate means and the second hinge plate means and cylinder means secured to the other end of the second hinge plate means having the piston thereof extensible through the aperture means on the other end of the second hinge plate means;
- pin means securing the hinge means of the first hinge plate means to the hinge means of the second hinge plate means; and
- fluid line means interconnecting the cylinder means of the first hinge plate means and the cylinder means of the second hinge plate means having connector means thereon.

5. The apparatus of claim 1 wherein the motor means comprises electrical motor means.

6. The apparatus of claim 1 wherein the motor means comprises pneumatic motor means.

7. The apparatus of claim 2 wherein the draft gear compression cylinder means further comprises:
- cylinder means having piston means extensible from one end thereof;
- mounting plate means secured to the other end of the cylinder means;
- L-shaped bracket means secured to the mounting plate means; and
- connector means connected to the other end of the cylinder means and extending into a portion of the recess means in the second arm portion of the U-shaped frame means.

8. The apparatus of claim 7 wherein the hinged center sill press means further comprises:
- first hinge plate means having hinge means on one end thereof, aperture means on the other end thereof, side plate means, reinforcing plate means secured to the side plate means and the first hinge plate means and cylinder means secured to the other end of the first hinge plate means having the piston thereof extensible through the aperture means on the other end of the first hinge plate means;
- second hinge plate means having hinge means on one end thereof, aperture means on the other end thereof, side plate means, reinforcing plate means secured to the side plate means and the second hinge plate means and cylinder means secured to the other end of the second hinge plate means having the piston thereof extensible through the aperture means on the other end of the second hinge plate means;
- pin means securing the hinge means of the first hinge plate to the hinge means of the second hinge plate means; and
- fluid line means interconnecting the cylinder means of the first hinge plate means and the cylinder means of the second hinge plate means having connector means thereon.

9. The apparatus of claim 1 wherein the lifting apparatus further comprises:
- generally centrally located bracket means secured to the rectangular frame means; and
- pivot means pivotally secured to the generally centrally located bracket means having the wheel means located on one end of the rectangular frame means secured to one end thereof
- whereby the handle means is movably secured to the other end of the pivot means.

10. A draft gear removal apparatus for the removal of draft gear from the center sill of a railcar, wherein the draft gear removal apparatus comprises:
- lifting apparatus means comprising:
  - rectangular frame means;
  - wheel means secured to the rectangular frame means about the periphery thereof and having a portion thereof extending above the rectangular frame means;
  - a plurality of first lower arm means, each having one end thereof removably secured to the rectangular frame means;
  - a plurality of second lower arm means, each having one end thereof movably secured to the rectangular frame means and movably secured to one of the plurality of first lower arm means;
  - a plurality of first upper arm means, each having one end thereof movably secured to the other end of one of the plurality of second lower arm means;
  - a plurality of second upper arm means, each having one end thereof movably secured to the other end of one of the plurality of the first lower arm means;
  - table means having frame means and top means having a plurality of apertures therein, each of the plurality of second upper arm means having the other end thereof movably secured to the frame means of the table means and each of the plurality of the first upper arm means having the other end thereof movably secured to the rectangular frame means of the table means;
  - hydraulic cylinder means having one end thereof secured to the plurality of first lower arm means and the other end thereof secured to the plurality of first upper arm means;
  - pump means mounted on the rectangular frame means for supplying fluid under pressure to the hydraulic cylinder means;
  - motor means mounted on the rectangular frame means for driving the pump means;
  - bracket means secured to the rectangular frame means;
  - tongue means movably secured to the bracket means;
  - handle means movably secured to the tongue means;
  - flow control means to control the flow of fluid to the hydraulic cylinder means from the pump means; and
  - over-center valve means disposed between the pump means and hydraulic cylinder means; and
- draft gear compression apparatus comprising;
  - U-shaped frame means having a center portion, first arm portion connected to one end of the center portion, second arm portion connected to the other end of the center portion having aperture means therein and a plurality of feet means secured to the center portion, each having a pin means projecting therefrom which mates with an aperture of the plurality of apertures in the top of the table means;
  - draft gear compression cylinder means detachably secured to the second arm portion of the U-shaped frame means, the draft gear compression cylinder means including:
    - cylinder means having piston means extensible from one end thereof;
    - mounting plate means secured to the other end of the cylinder means;
    - L-shaped bracket means secured to the mounting plate means; and
    - connector means connected to the other end of the cylinder means and extending into a portion of the recess means in the second arm portion of the U-shaped frame means; and
  - hinged center sill press means movable on the center portion of the U-shaped frame means and having hydraulic cylinder means mounted thereon, the hinged center sill press means including:
    - first hinge plate means having hinge means on one end thereof, aperture means on the other end thereof, side plate means, reinforcing plate means secured to the side plate means and the first hinge plate means and cylinder means secured to the other end of the first hinge plate means having the piston thereof extensible through the aperture means on the other end of the first hinge plate means;

second hinge plate means having hinge means on one end thereof, aperture means on the other end thereof, side plate means, reinforcing plate means secured to the side plate means and the second hinge plate means and cylinder means secured to the other end of the second hinge plate means having the piston thereof extensible through the aperture means on the other end of the second hinge plate means;

pin means securing the hinge means of the first hinge plate means to the hinge means of the second hinge plate means; and fluid line means interconnecting the cylinder means of the first hinge plate means and the cylinder means of the second hinge plate means having connector means thereon.

11. A draft gear removal apparatus for the removal of draft gear from the center sill of a railcar, wherein the draft gear removal apparatus comprises:

lifting apparatus means comprising:

rectangular frame means;

wheel means secured to the rectangular frame means about the periphery thereof and having a portion thereof extending above the rectangular frame means;

a plurality of first lower arm means, each having one end thereof removably secured to the rectangular frame means;

a plurality of second lower arm means, each having one end thereof movably secured to the rectangular frame means and movably secured to one of the plurality of first lower arm means;

a plurality of first upper arm means, each having one end thereof movably secured to the other end of one of the plurality of second lower arm means;

a plurality of second upper arm means, each having one end thereof movably secured to the other end of one of the plurality of the first lower arm means;

table means having frame means and top means having a plurality of apertures therein, each of the plurality of second upper arm means having the other end thereof movably secured to the frame means of the table means and each of the plurality of the first upper arm means having the other end thereof movably secured to the rectangular frame means of the table means;

hydraulic cylinder means having one end thereof secured to the plurality of first lower arm means and the other end thereof secured to the plurality of first upper arm means;

pump means mounted on the rectangular frame means for supplying fluid under pressure to the hydraulic cylinder means;

motor means mounted on the rectangular frame means for driving the pump means;

generally centrally located bracket means secured to the rectangular frame means;

pivot means pivotally secured to the generally centrally located bracket means having the wheel means located on one end of the rectangular frame means secured to one end thereof;

handle means movably secured to the other end of the pivot means;

flow control means to control the flow of fluid to the hydraulic cylinder means from the pump means; and over-center valve means disposed between the pump means and hydraulic cylinder means; and draft gear compression apparatus comprising;

U-shaped frame means having a center portion, first arm portion connected to one end of the center portion, second arm portion connected to the other end of the center portion having aperture means therein and a plurality of feet means secured to the center portion, each having a pin means projecting therefrom which mates with an aperture of the plurality of apertures in the top of the table means;

draft gear compression cylinder means detachably secured to the second arm portion of the U-shaped frame means, the draft gear compression cylinder means including:

cylinder means having piston means extensible from one end thereof;

mounting plate means secured to the other end of the cylinder means;

L-shaped bracket means secured to the mounting plate means; and connector means connected to the other end of the cylinder means and extending into a portion of the recess means in the second arm portion of the U-shaped frame means; and hinged center sill press means movable on the center portion of the U-shaped frame means and having hydraulic cylinder means mounted thereon, the hinged center sill press means including:

first hinge plate means having hinge means on one end thereof, aperture means on the other end thereof, side plate means, reinforcing plate means secured to the side plate means and the first hinge plate means and cylinder means secured to the other end of the first hinge plate means having the piston thereof extensible through the aperture means on the other end of the first hinge plate means;

second hinge plate means having hinge means on one end thereof, aperture means on the other end thereof, side plate means, reinforcing plate means secured to the side plate means and the second hinge plate means and cylinder means secured to the other end of the second hinge plate means having the piston thereof extensible through the aperture means on the other end of the second hinge plate means;

pin means securing the hinge means of the first hinge plate means to the hinge means of the second hinge plate means; and fluid line means interconnecting the cylinder means of the first hinge plate means and the cylinder means of the second hinge plate means having connector means thereon.

* * * * *